May 30, 1961
F. P. DUNIGAN
2,986,688
ADJUSTABLE SPEED DRIVE
Filed Dec. 8, 1958
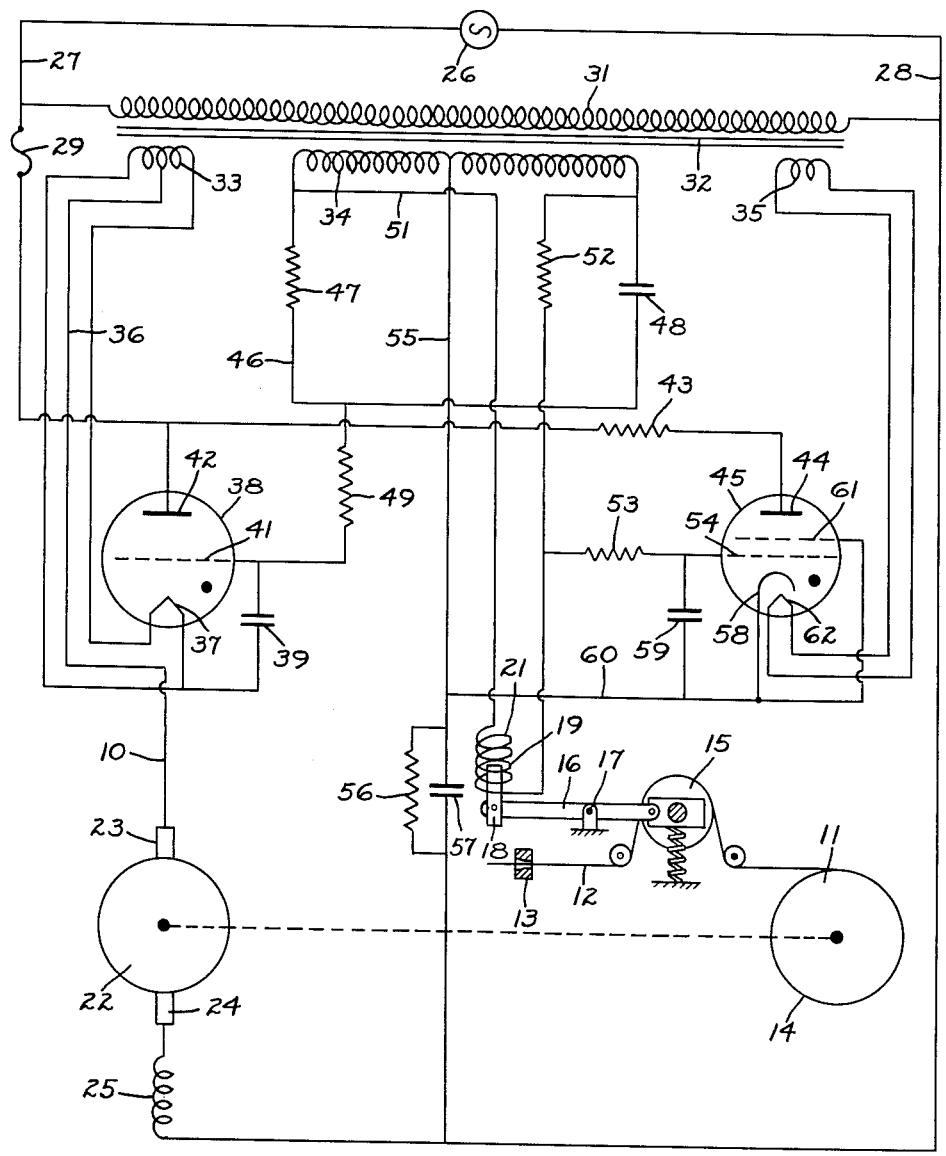
INVENTOR.
Francis P. Dunigan
BY
Norman F. Blodgett
Attorney United States Patent Office 2,986,688
Patented May 30, 1961

2,986,688
ADJUSTABLE SPEED DRIVE

Francis P. Dunigan, Holden, Mass., assignor to Machinery Electrification, Inc., Northboro, Mass., a corporation of Massachusetts Filed Dec. 8, 1958, Ser. No. 778,965
7 Claims. (Cl. 318—345)

This invention relates to an adjustable speed drive and more particularly to drive apparatus including an electronic circuit capable of adjusting the speed of the drive to maintain a factor in the driven apparatus at a constant predetermined value.

It is necessary in many applications to adjust the speed of the drive motor to maintain some other element in the driven apparatus at a constant predetermined value. An example of this is the drive associated with a wire drawing machine where it is necessary to maintain the tension in the wire at a fixed value, since the tension in the wire has a much greater effect on the gauge of the wire being drawn than the speed at which it is drawn. In such installations it is usual practice to take the measurement of the factor which is to be maintained at a constant value and by means of an electrical control apparatus to adjust the speed of the drive motor to maintain this value. The major difficulty experienced with the prior art apparatus for so regulating the drive motor is that the drive control is only able to compensate the speed of the motor to a value commensurate with the measurement of the factor which must be maintained at a constant value; this does not take into account such situations where the motor is also being subjected to varying degrees of load and therefore its speed changes despite the attempt of the control apparatus to maintain it at a value corresponding to the value of the factor. These and other difficulties experienced with the prior art devices have been obviated in a novel manner by the present invention.

It is, therefore, an outstanding object of the present invention to provide an adjustable speed drive of the reactor-controlled type in which a particular reactor setting results in a particular motor voltage which will stay fixed relatively independently of load on the motor.

It is another object of this invention to provide a drive in which a reactor sets the speed of the operation of a motor and the load can vary on the motor over the range of "no load" to "full load" with substantially no change in motor speed.

It is another object of the invention to provide an adjustable speed drive in which a reactor measures a quality in the driven equipment and feeds a signal into a phase shift network to feed a thyratron controlling a motor, in which a particular setting of the reactor will result in a particular multiple motor voltage which will stay at a predetermined value despite changes in load on the motor.

With these and other objects in view, as will be apparent to those skilled in the art, the invention resides in the combination of parts set forth in the specification and covered by the claims appended hereto.

The character of the invention, however, may be best understood by reference to one of its forms as illustrated by the accompanying drawing in which:

The single figure is a schematic view of an adjustable speed drive incorporating the principles of the present invention.

Referring to the drawing, it can be seen that the adjustable speed drive indicated generally by the reference numeral 10 is shown in use with a driven apparatus 11 which, for the sake of illustration, is shown as an impression of a wire drawing machine. The wire 12 is drawn through a wire drawing die 13 by means of a drum or block 14. After leaving the die, but before being coiled around the block 14, the wire passes over a dancer roll 15 which is mounted for movement transversely of the line of motion of the wire. A lever arm 16 is pivotally mounted to the base of the machine in its intermediate portion by means of a pivot 17, and one free end is hingedly attached to the dancer roll. The other end has mounted thereon the core 18 of a reactor 19 which is provided with a coil 21 through which the core 18 may move longitudinally in response to movements of the dancer roll 15 transversely of the path of the wire. The block 18 is connected to the outward shaft of the motor 22 which is of the direct current type, and is provided with armature commutator blocks 23 and 24 and a series field 25.

A source of alternating current 26 is connected across power lines 27 and 28, the power line 27 being provided with a current limiting device, such as a fuse 29. The primary winding 31 of a transformer 32 is connected between the power lines 27 and 28. The transformer is provided with three secondary windings 33, 34 and 35. A center tap of the winding 33 is connected to one end of a line 36, the other end of which is connected to the commutator block 23 of the motor 22. To one end of a heater type cathode 37 of a thyratron 38 and the other end of the wire 33 is connected to the other side of the said cathode. The first-mentioned side of the cathode 37 is connected through a capacitor 39 to the grid 41 of the thyratron. The plate 42 of the thyratron is connected to the line 27 and is also connected through a resistor 43 to the plate 44 of a thyratron 45.

The secondary winding 34 is connected into a phase shift network 46. One end of the winding is connected through a resistor 47 to one end of a capacitor 48, the other end of which is connected to the other end of the winding 34. The connected ends of the resistor 47 and the capacitor 48 are connected through a resistor 49 to the control grid 41 of the thyratron 38. The line 51 joins the common ends of the winding 34 and the resistor 47 to one end of the coil 19 of the reactor 21. The common ends of the winding 34 and the capacitor 48 are connected through a resistor 52 to the other end of the coil 19, while the common ends of the resistor 52 and the coil 19 are joined through a resistor 53 to the control grid 54 of the thyratron 45. A center tap associated with the winding 34 is connected by a line 55 to one side of a resistor 56, the other end of which is connected to the end of the field 25 which is not connected to the block 24. A capacitor 57 is connected across the resistor 56. A point on the line 55 between the resistor 56 and the winding 34 is connected to the cathode 58 of the thyratron 45 by means of a line 60. An intermediate part of the line 60 is connected by a capacitor 59 to the control grid 54 of the thyratron 45. The cathode 58 is also connected directly to the screen grid 61 of the thyratron 45. The thyratron 45 is provided with a heater 62 which is connected on its opposite ends to the opposite ends of the secondary winding 35 of the transformer 32. A study of the drawing will indicate that the resistor 43 is the plate resistor of the thyratron 45, while the resistor 56 is a cathode resistor associated with that tube.

It will be understood that the motor 22 does not need to be provided with a series field 25, but may, if desired, be used with a separately excited shunt field energized through a rectifier by another secondary winding of the transformer 32.

The operation of the apparatus will now be readily understood, in view of the above description. It can be seen that the coil 19 of the reactor 21 forms part of the phase shift network 46 which is connected through the resistors 52 and 53 to the control grid 54 of the thyratron 45. A change of position of the coil 18 within the coil 19 will change the amount of phase shift derived from the network relative to the phasing loadage across the thyratron 45 derived from its connection to the line 27 and the center tap of the secondary winding 34 of the transformer 32. The amount of phase shift on the grid 54 will determine the current passing through the thyratron 45, so that the position of the dancer roll 15 will make itself felt through the reactor 21 to determine a definite flow of current through the thyratron 45. This, in turn, will cause a definite drop in voltage across the resistor 56 which lies in its cathode circuit. Now, the armature of the motor 22 is connected by means of the commutator blocks 23 and 24 in the cathode circuit of the thyratron 38, and while the current passing through the thyratron 45 is controlled by the phase shift method, the current passing through the thyratron 38 is controlled by raising and lowering a direct current reference voltage on its control grid 41. It is well known to control the speed of a thyratron controlled motor by means of an adjustable resistor or potentiometer in its control grid circuit. In the present case, however, the cathode resistor 56 associated with the thyratron 45 acts in a manner similar to the rheostat often used with the thyratrons. The voltage drop across the resistor 56 is always a predetermined amount, determined by the position of the dancer roll 15, and the inductance in the coil 19. Since this voltage drop is relatively independent of anything but the reactor position, a direct current command signal is provided for the thyratron 38 which is independent of motor load. The thyratron 38 necessarily tries to match the counter E.M.F. of the armature of the motor 22 with this command signal, and regardless of the loading on the motor tries to sustain the counter E.M.F. at a fixed value. Of course, if this were achieved perfectly, there would be a zero speed regulation on the motor. In practice it is possible to hold this counter E.M.F. value within one or two percent.

Hence, a drive has been provided in which the reactor sets the speed for the operation of the motor and the load can vary on the motor over the range of "no load" to "full load" with substantially no change in motor speed. In a practical application of this invention a C6J/K thyratron was used for the thyratron 38 and a 2D21 thyratron was used in the case of the thyratron 45. The plate anode resistor 33 associated with the thyratron 45 was selected as 10,000 ohms and the cathode resistor 56 was selected as 10,000 ohms, while the shunt capacitor 57 was selected by one-half mfd. The resistor 52 was selected at 500 ohms, and the resistor 53 at .1 ohm. The capacitors 59 and 39 were selected at .005 mfd., while the capacitor 48 was selected at .05 mfd. The resistor 47 was 47,000 ohms and the resistor 49 at .1 ohm. The alternating current source 26 provided 220 volts.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having thus been described, what is claimed as new and desired to secure by Letters Patent, is:

I claim:

1. An adjustable speed drive for a motor adapted to be connected to a load, comprising a variable reactor giving a reactance indicative of a condition of the load which condition is dependent on the speed of the motor, a main thyratron connected to the motor to control the speed thereof, a secondary thyratron having a cathode resistor connected to the grid of the main thyratron, a phase network connected to the reactor and also connected to the grid of the secondary thyratron to regulate the firing point thereof.

2. An adjustable speed drive for a direct current motor adapted to be connected to a load, comprising a variable reactor whose reactance is indicative of a condition of the load which condition is dependent on the speed of the motor, a main thyratron connected to the motor armature to control the speed of the motor, a secondary thyratron having a cathode resistor connected to the control grid of the main thyratron, a phase network connected to the reactor and also connected to the control grid of the secondary thyratron to control the firing point thereof.

3. An adjustable speed drive for a direct current motor adapted to be connected to a load, comprising a variable reactor whose reactance is indicative of a condition of the load which condition is dependent on the speed of the motor, a main thyratron connected to the motor armature to control the speed of the motor, a secondary thyratron having a cathode resistor connected to the control grid of the main thyratron, a phase network connected to the reactor and also connected to the control grid of the secondary thyratron to regulate the firing point thereof, the cathodes of the two thyratrons being connected through the said cathode resistor and the motor armature so that the main thyratron maintains the counter E.M.F. of the motor equal to the drop in voltage across the cathode resistor.

4. An adjustable speed drive for a direct current motor adapted to be connected to a load, comprising a phase shift network, a variable reactor forming part of a network, the reactance of the reactor being indicative of a condition of the load which condition is dependent on the speed of the motor, the main thyratron connected to the motor armature to control the speed of the motor, a secondary thyratron having a cathode resistor connected to the cathode grid of the main thyratron, a capacitor connected across the said cathode resistor, the phase shift network being connected to the control grid of the secondary thyratron to regulate the firing point thereof and to bring about a cathode current indicative of the said condition of the load, the cathodes of the two thyratrons being connected through the said cathode resistor and the motor armature in series, so that the main thyratron maintains the counter E.M.F. of the motor equal to the drop in voltage across the said cathode resistor.

5. An adjustable speed drive for a direct current motor adapted to be connected to a load, comprising a transformer having a primary winding connected to a source of alternating current electricity, a phase shift network including a secondary winding of the said transformer and a resistor, a variable reactor forming part of the network, the reactor and the resistor being connected in series with one another across the ends of the said secondary winding, the reactance of the reactor being indicative of a condition of the load which condition is dependent on the speed of the motor, a main thyratron connected to the motor armature to control the speed of the motor, a secondary thyratron having a cathode resistor connected to the control grid of the main thyratron, a capacitor connected across the said cathode resistor, the phase shift network being connected from a point between the resistor and the reactor to the control grid of the secondary thyratron to regulate the firing point thereof and to bring about a cathode current indicative of the said condition of the load, a point between the cathode resistor and the cathode of the secondary thyratron being connected to a center tap of the said secondary winding, the cathodes of the two thyratrons being connected through the said cathode resistor and the motor armature in series, so that the main thyratron maintains the counter E.M.F. of the motor equal to the drop in voltage across the said cathode resistor.

6. An adjustable speed drive for a motor adapted to be connected to a load, comprising a variable reactor, a main thyratron connected to the motor to control the speed thereof, a secondary thyratron having a cathode resistor connected to the grid of the main thyratron, a phase network connected to the reactor and also conneced to the grid of the secondary thyratron to regulate the firing point thereof.

7. An adjustable speed drive for a direct current motor adapted to be connected to a load, comprising a variable reactor, a main thyrathron connected to the motor armature to control the speed of the motor, a secondary thyratron having a cathode resistor connected to the control grid of the main thyratron, a phase network connected to the reactor and also connected to the control grid of the secondary thyratron to regulate the firing point thereof, the cathodes of the two thyratrons being connected through the said cathode resistor and the motor armature so that the main thyratron maintains the counter E.M.F. of the motor equal to the drop in voltage across the cathode resistor.

References Cited in the file of this patent
UNITED STATES PATENTS

| | | |
|---|---|---|
| 2,032,176 | Kovalsky | Feb. 25, 1936 |
| 2,432,529 | Locke | Dec. 16, 1947 |
| 2,444,921 | Dawson et al. | July 13, 1948 |
| 2,554,956 | Reeves | May 29, 1951 |